(12) United States Patent
Mannherz et al.

(10) Patent No.: US 10,214,190 B2
(45) Date of Patent: Feb. 26, 2019

(54) METHOD AND DEVICE FOR OPERATING A BRAKING SYSTEM, BRAKING SYSTEM

(71) Applicant: Robert Bosch GmbH, Stuttgart (DE)

(72) Inventors: Edith Mannherz, Weinsberg (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/711,068

(22) Filed: Sep. 21, 2017

(65) Prior Publication Data

US 2018/0148023 A1 May 31, 2018

(30) Foreign Application Priority Data

Nov. 30, 2016 (DE) .......................... 10 2016 223 845

(51) Int. Cl.
| | |
|---|---|
| *B60T 8/172* | (2006.01) |
| *B60T 8/94* | (2006.01) |
| *B60T 13/74* | (2006.01) |
| *B60T 8/26* | (2006.01) |
| *B60T 17/22* | (2006.01) |

(52) U.S. Cl.
CPC .............. *B60T 8/172* (2013.01); *B60T 8/266* (2013.01); *B60T 8/94* (2013.01); *B60T 13/74* (2013.01); *B60T 17/22* (2013.01); *B60T 2270/413* (2013.01)

(58) Field of Classification Search
CPC ... B60T 8/17; B60T 8/172; B60T 8/88; B60T 8/885; B60T 8/92; B60T 8/94; B60T 13/74; B60T 13/741; B60T 13/746

USPC ....................................................... 303/122.08
See application file for complete search history.

(56) References Cited

U.S. PATENT DOCUMENTS

| | | | | |
|---|---|---|---|---|
| 6,158,822 | A | * 12/2000 | Shirai | ...................... B60T 13/74 |
| | | | | 188/1.11 L |
| 9,511,757 | B2 | * 12/2016 | Baehrle-Miller | ..... B60T 13/588 |
| 2018/0037208 | A1 | * 2/2018 | Englert | ................... B60T 8/171 |

FOREIGN PATENT DOCUMENTS

| | | | |
|---|---|---|---|
| DE | 10 2010 040 573 A1 | 3/2012 | |
| GB | 2506259 A * | 3/2014 | ............ B60T 13/588 |
| JP | 09109876 A * | 4/1997 | |

* cited by examiner

*Primary Examiner* — Thomas J Williams
(74) *Attorney, Agent, or Firm* — Maginot, Moore & Beck LLP

(57) ABSTRACT

A method for operating a hydraulic braking system of a motor vehicle includes generating a force for displacing a brake piston of a wheel brake of the brake system via a pressure generator and an electromechanical actuator to actuate the wheel brake. The pressure generator and the actuator are controlled to collectively generate a total clamping force at the wheel brake in order to enable a parking brake function. During the enabling procedure, an operating current of the actuator is monitored to determine a functional capability of the braking system, and the pressure generator is controlled such that the hydraulic pressure is modulated for a predeterminable period of time to unload or to load the actuator. The operating current of the actuator during this time period in order to determine the functional capability of the braking system.

10 Claims, 4 Drawing Sheets

METHOD AND DEVICE FOR OPERATING A BRAKING SYSTEM, BRAKING SYSTEM

This application claims priority under 35 U.S.C. § 119 to patent application no. DE 10 2016 223 845.0, filed on Nov. 30, 2016 in Germany, the disclosure of which is incorporated herein by reference in its entirety.

BACKGROUND

The disclosure relates to a method for operating a hydraulic braking system of a motor vehicle, wherein the braking system comprises at least one wheel brake, a brake pedal device and at least one pressure generator that can be controlled so as to hydraulically actuate the wheel brake, and also an electromechanical actuator that is allocated to the wheel brake so as to actuate the wheel brake, wherein a force for displacing a brake piston of the wheel brake so as to actuate said wheel brake can be generated in each case by means of the pressure generator and actuator, wherein in order to enable a parking brake function the pressure generator and the actuator are controlled in such a manner that said pressure generator and actuator together generate a total clamping force at the wheel brake, and wherein an operating current of the actuator is monitored during the enabling procedure in order to determine the functional capability of the hydraulic braking system.

Methods, devices and braking systems of the type mentioned in the introduction are already known from the prior art. By way of example, German patent application DE 10 2010 040 573 A1 discloses a braking system of the type mentioned in the introduction having a hydraulic pressure generator and an electromechanical actuator that are simultaneously controlled so as to adjust a parking brake. In order to monitor whether the hydraulic part of the braking system is functioning correctly, a characteristic variable of the actuator is monitored and checked for inconsistencies. In the event of a current curve of the actuator lying outside a permissible value range, a malfunction is detected. This is by way of example the case if the hydraulic assistance fails and as a consequence the actuator requires more force in order to displace the brake piston so that as a consequence the operating current of the actuator increases above an expected value.

SUMMARY

The method in accordance with the disclosure has the advantage that, when enabling the parking brake function, the pressure generator is controlled in such a manner that the hydraulic pressure that is generated is modulated for a predeterminable period of time in order to unload or load the actuator, and that the operating current of the actuator is evaluated in this period of time. In other words, in accordance with the disclosure, it is provided that the hydraulic pressure that is generated by the pressure generator is varied within a predetermined period of time in order to check whether this leads to a discernible corresponding response in the operating current of the actuator. As a consequence, the braking system is tested for functional capability. The method is implemented for this purpose preferably regularly, in particular at evenly spaced time intervals and/or whenever the braking system is brought into operation. In particular, it is provided that the hydraulic pressure is increased for the predeterminable period of time by means of the modulation procedure in order to unload the actuator or said hydraulic pressure is reduced in order to load the actuator.

In accordance with an advantageous development of the disclosure, it is provided that the functional capability of the braking system is established if the operating current falls below a predeterminable first threshold value within the period of time in the case of an increased hydraulic pressure. If the hydraulic pressure increases, the actuator is unloaded so that said actuator receives less current so that the operating current reduction within the period of time clearly indicates that the hydraulic system is functioning.

Furthermore, it is preferably provided that the functional capability of the braking system is established if the operating current exceeds a predeterminable second threshold value within the period of time in the case of a reduced hydraulic pressure. If the hydraulic pressure reduces within the period of time, the load on the actuator is increased so that the operating current increases. If the operating current does not increase in this manner when reducing the hydraulic pressure, it is to be established that a malfunction must be present in the hydraulic system or in the hydraulic part of the braking system. In particular, it is possible to conclude that a hydraulic line in the braking system has become trapped. The same applies if, in the case of increasing the hydraulic pressure, the operating current does not fall below the predetermined first threshold value. The term "increasing or reducing the hydraulic pressure" in this respect is to be understood to mean controlling the pressure generator so as to increase or reduce the hydraulic pressure. Whether the hydraulic pressure actually increases or reduces depends on the functional capability of the braking system.

Furthermore, it is preferably provided that the functional capability of the braking system is established if a gradient of the operating current comprises a local minimum within the period of time when increasing the hydraulic pressure. As an alternative to comparing the operating current to the first threshold value, it is also provided that the operating current gradient is checked for a local minimum. If such a local minimum appears, it is concluded that the hydraulic part of the braking system is functioning. If a minimum of this type is not identified, it is identified from this that a malfunction is present in the hydraulic system.

Furthermore, it is accordingly preferably provided that the functional capability of the braking system is established if the gradient of the operating current comprises a local maximum within the period of time when reducing the hydraulic pressure. As a consequence, it is ensured that the functional capability of the braking system can be rapidly and reliably ascertained.

Furthermore, it is preferably provided that, if the braking system comprises multiple wheel brakes, each wheel brake being allocated an electromechanical actuator, the operating currents of the actuators that are ascertained within the period of time are compared to one another so as to perform a plausibility check. In particular, the operating currents from the actuators are compared to one another, said operating currents being located in the same braking circuit of the braking system and in this respect being influenced by the same hydraulic pressure. It is thereby possible to establish by means of this plausibility check whether the braking circuit or by way of example only one actuator of the braking circuit is damaged.

Furthermore, it is preferably provided that the period of time is selected in such a manner that it lies in a region of a buildup of clamping force of the wheel brake. The method is therefore only implemented if a zero clearance or pre-travel clearance of the actuator has been overcome and a buildup of clamping force occurs by means of the actuator or the brake piston of the wheel brake, said brake piston being pressed against a brake disk. In this section, the operating current behaves typically in such a manner that said operating current steadily increases. In particular, the influence of a reduced or increased hydraulic pressure can be reliably established here.

In accordance with a preferred development of the disclosure, it is provided that until the region of the buildup of clamping force is reached, the pressure generator is controlled in such a manner that the hydraulic pressure is held constant or at least essentially constant. As a consequence, it is ensured that until the buildup of clamping force the accelerator pedal does not experience an unexpected or undesired position change that would be noticeable for the driver.

The device in accordance with the disclosure is distinguished by means of a control device that is specifically configured to implement the method in accordance with the disclosure in the case of the intended use. As a consequence, the abovementioned advantages are achieved.

The braking system in accordance with the disclosure is distinguished by means of the embodiment of the control device in accordance with the disclosure. As a consequence, the abovementioned advantages are achieved.

Further advantages and preferred features and feature combinations are evident in particular in the above description and also in the claims.

BRIEF DESCRIPTION OF THE DRAWINGS

The disclosure is to be further explained hereinunder with reference to the drawings. In the drawings.

DETAILED DESCRIPTION

Figure 1:
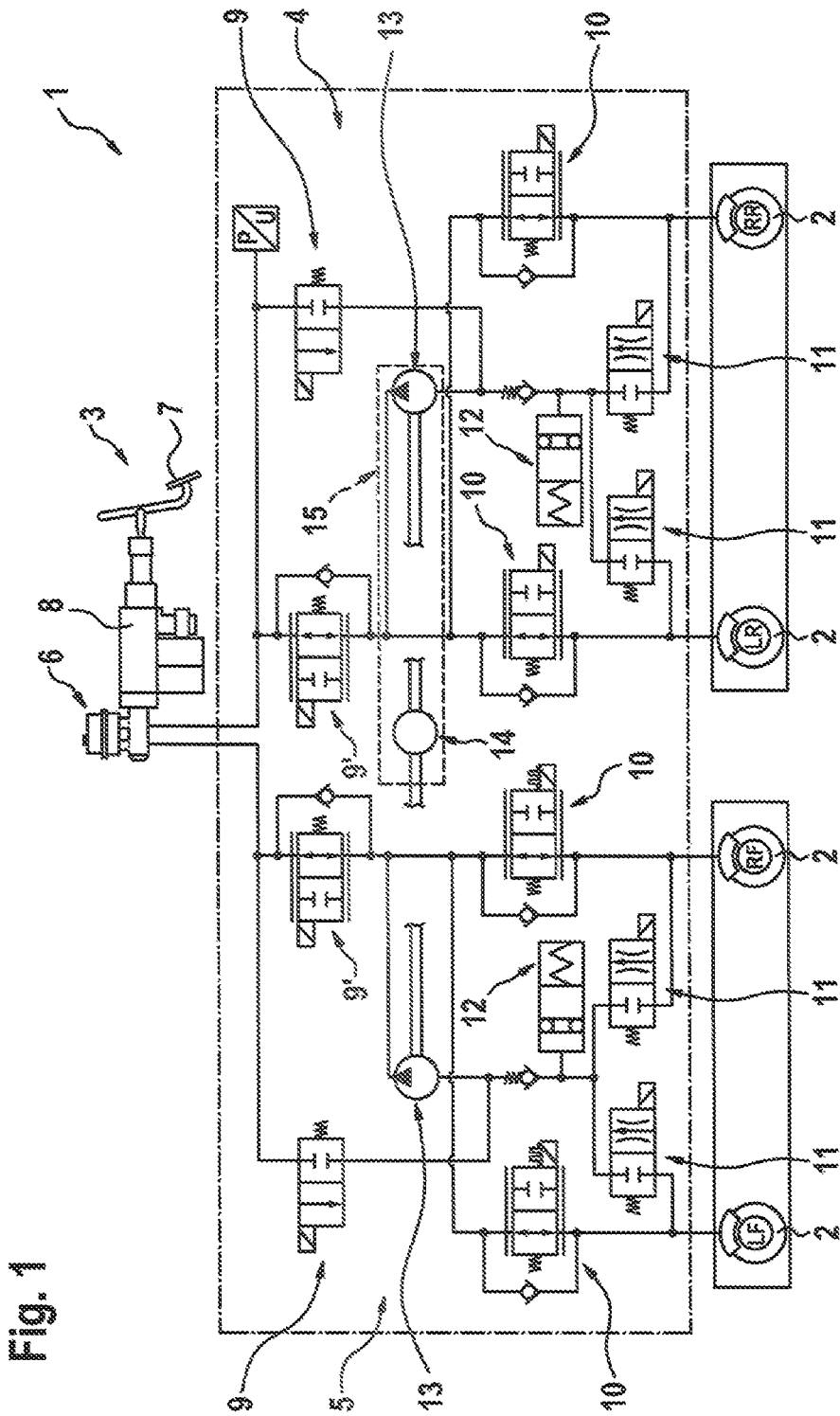
FIG. 1 illustrates a braking system of a motor vehicle in a simplified view.

FIG. 1 illustrates in a simplified view a braking system 1 for a motor vehicle that is not further illustrated. The braking system 1 comprises multiple wheel brakes 2 that can be actuated by a driver of the motor vehicle by means of a brake pedal device 3 as service brakes. The wheel brakes 2 are referred to as LF, RF, LR and RR here, as a result of which their position or allocation on the motor vehicle is explained, wherein LR stands for left rear, RF stands for right front, LF stands for left front and RR stands for right rear. Two braking circuits 4 and 5 are embodied between the brake pedal device 3 and the wheel brakes 2, wherein the braking circuit 4 is allocated to the wheel brakes LR and RR and the braking circuit 5 is allocated to the wheel brakes LF and RF. The two braking circuits 4 and 5 are constructed identically so that the construction of the two braking circuits 4, 5 is to be further explained hereinunder with reference to the braking circuit 4.

The braking circuit 4 is initially connected to a master brake cylinder 6 of the brake pedal device 3, wherein the brake pedal device 3 moreover comprises a brake pedal 7 that can be actuated by the driver, and also an electromechanical braking force amplifier 8. The braking circuit 4 comprises a changeover valve 9' and also a high-pressure switching valve 9 that are connected in parallel with one another and are downstream of the master brake cylinder 6. The changeover valve 9' is embodied as open when not energized with current and renders possible a flow of the hydraulic medium of the braking circuit, in other words the brake fluid, in both directions. The high-pressure switching valve 9 is embodied as closed when not energized with a current and renders possible in the energized state a throughflow of brake fluid only in the direction of the wheel brakes 2. The changeover valve 9' is furthermore connected to the two wheel brakes 2 with an interconnection in each case of an inlet valve 10 that is embodied as open in the two directions when not energized with current. Moreover, in each case an outlet valve 11 is allocated to the wheel brakes 2 of the braking circuit 4, said outlet valve being embodied as closed when not energized with current. A hydraulic pressure storage device 12 is connected downstream of the outlet valves 11. The outlet valves 11 are moreover connected on the outlet side to a suction side of a pump 13, said pump being connected to the braking circuit 4 on the pressure side between the changeover valve 9' and the inlet valves 10. The pump 13 is mechanically coupled to an electric motor 14, wherein the pump 13 and the electric motor 14 together form a pressure generator 15 of the braking system 1. It is provided that the electric motor 14 is allocated to the pumps 13 of the two braking circuits 4 and 5. Alternatively, it can also be provided that each braking circuit 4, 5 comprises a dedicated electric motor 14. The electromechanical braking force amplifier 8 likewise forms a pressure generator of the braking system. In the present case, the two pressure generators, in other words the pressure generator 15 and the braking force amplifier 8, are provided in the braking system 1. However, it is possible that only one of the two is provided. The pump 13 can also be embodied by way of example as a hydraulic plunger/piston or as a piston pump or as a rotational pump.

If the two changeover valves 9' of the braking circuits 4, 5 are closed, the hydraulic pressure thus remains constrained or is maintained in the section lying downstream of the braking circuits 4, 5, in other words between the changeover valves and the wheel brakes 2 even if the driver releases the brake pedal 7.

Figure 2:
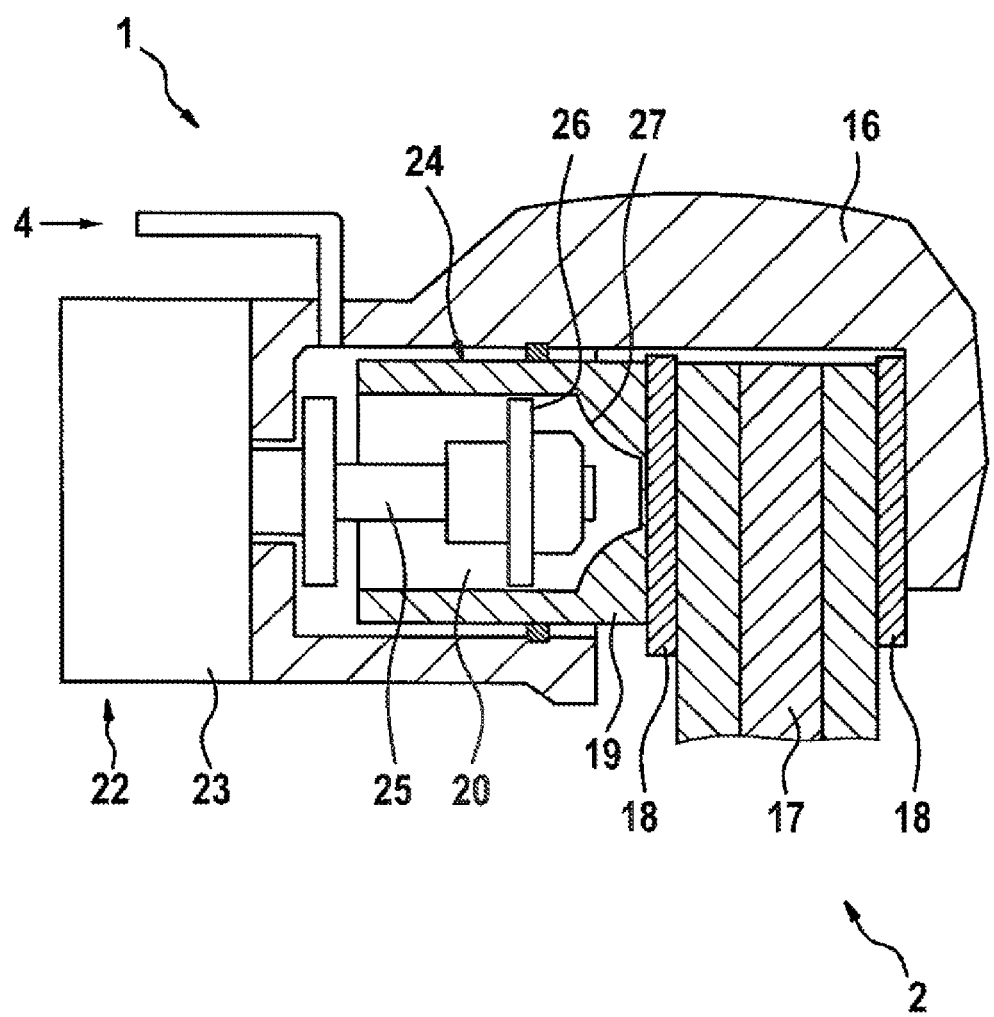
FIG. 2 illustrates a wheel brake of the braking system in a simplified longitudinal sectional view.

FIG. 2 illustrates in a simplified sectional view the embodiment of the wheel brakes 2. The respective wheel brake 2 comprises a brake caliper 16 that grips around a brake disk 17 on the end faces of said brake caliper, said brake disk being connected in a non-rotatable manner to a wheel of the motor vehicle. Each end face of the brake disk 17 is allocated a brake pad 18 of the wheel brake 2. One of the brake pads 18 is embodied or arranged on an end face of a brake piston 19 that is mounted in a displaceable manner on the brake caliper 16. The brake piston 19 comprises in longitudinal section a beaker-shaped structure so that said brake piston forms a hollow chamber 20 together with a receiving arrangement 21 of the brake caliper 16 in which the brake piston 19 is mounted in a displaceable manner. The hollow chamber 20 is fluidically connected to the inlet valve 10 so that if the inlet valve 10 and the changeover valve 9' are opened and the brake pedal 7 is actuated, the hydraulic pressure acts upon the brake piston 19 in order to displace said brake piston against the brake disk 17, as a result of which the brake disk 17 is braced or clamped between the brake pads 18 of the wheel brake 7. Alternatively, by means of closing the changeover valve 9' and controlling the pressure generator 15 the hydraulic pressure can be generated in the braking circuit 4 in an automated manner. This is true in the present case if the driver operates a button or switch to actuate a parking brake.

Moreover, an electromechanical actuator 22 is allocated to the brake piston 19, said electromechanical actuator comprising an electric motor 23 and a transmission 24 that is operatively connected to the electric motor 23. The transmission is embodied as a spindle transmission that comprises a spindle 25 that is connected in a non-rotatable manner to the electric motor 23, and also a spindle nut 26 that is mounted in a non-rotatable manner in the brake piston 19 and in a longitudinally displaceable manner on the spindle 25. If the spindle is driven by means of the electric motor 23, the spindle nut 26 is as a consequence displaced longitudinally in the brake piston 19. The spindle nut 26 can be displaced by means of the rotational movement of the spindle 25 in such a manner that said spindle nut makes contact with an axial stop 27 of the brake piston 19 in the chamber 20, as a result of which the brake piston 19 is carried along by means of the spindle nut 26. Consequently, it is likewise possible by means of controlling the actuator 22 to apply a force to the brake piston 19 to displace said brake piston and said force is superimposed or can be superimposed by the force that is applied by means of the hydraulic pressure.

Consequently, the parking brake function of the braking system 1 is achieved by means of generating the braking force by means of the pressure generator 15 and the actuator 22, wherein the hydraulic pressure of the pressure generator assists or unloads the actuator 22, as a result of which the actuator 22 itself can be dimensioned to be smaller and still applies sufficient force for securing the parking brake or the braking system. In order to securely hold the vehicle at a standstill, it is necessary to monitor the force contributions of the pressure generator and the actuator 22. It is thereby ensured that by way of example the hydraulic pressure assistance during the brake application procedure is actually effective. A ruptured brake line or a trapped brake line can lead to the wheel brakes not being sufficiently hydraulically assisted during a brake application procedure and consequently the required brake application forces cannot be achieved. The procedure of directly ascertaining the hydraulic pressure in the respective braking circuit 4, 5 is itself unsuitable if the line involved is trapped. A pressure sensor that is typically allocated to the master brake cylinder only determines the pressure in the master brake cylinder, said pressure however does not correspond to the hydraulic pressure in or at the wheel brake 2, in particular if the supply line is trapped.

Figure 3:
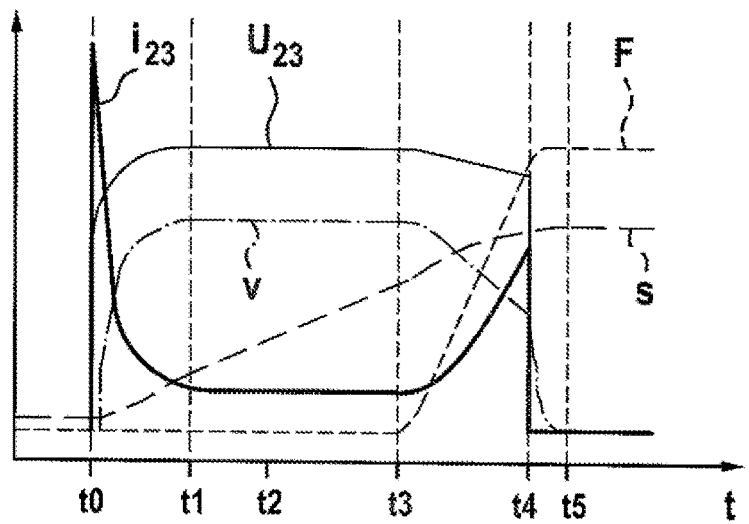
FIG. 3 shows a graph for explaining the operation of the braking system.

A brake application procedure is illustrated in FIG. 3. The driver initiates the brake application procedure by way of a parking brake switch at the point in time $t_0$. The hydraulic and electromechanical actuator, in other words the pressure generator 15 and actuator 22, are controlled simultaneously in order to provide an effective braking force as early as possible in particular to the rear axle of the motor vehicle and to hold the vehicle at a standstill. The holding pressure in the present case is only built up and held constant at the wheels of the rear axle.

The actuator 22 overcomes in accordance with FIG. 3 the mechanical zero clearance between t1 and t3. After the actuator 22 moves to building up the clamping force after overcoming the zero clearance, electromechanical clamping force is also applied to the brake piston 19 in addition to the hydraulic portion.

The operating current $i_{23}$ of the actuator 22 is monitored and measured during the brake application procedure. The operating current $i_{23}$ and the operating voltage $u_{23}$ of the actuator 22 represent a starting variable of the braking system 1, wherein with increasing mechanical load or clamping force F the current $i_{23}$, described simply, increases proportionally as is illustrated in FIG. 3.

If a hydraulic pressure is simultaneously built up by means of the pressure generator 15 during the buildup of clamping force, in which the mechanical load acts upon the actuator 22, this is demonstrated in the current profile or in the curve of the operating current of the actuator 22. As soon as an additional hydraulic unloading occurs by means of further buildup of braking pressure p(t) of the pressure generator 15, the actuator 22 experiences a smaller mechanical load and the current $i_{23}$ that is received drops. This is illustrated schematically in FIG. 4 in the upper graph that illustrates the curve of the operating current $i_{23}$ and the hydraulic pressure $p_{15}$ over time t.

Figure 4:
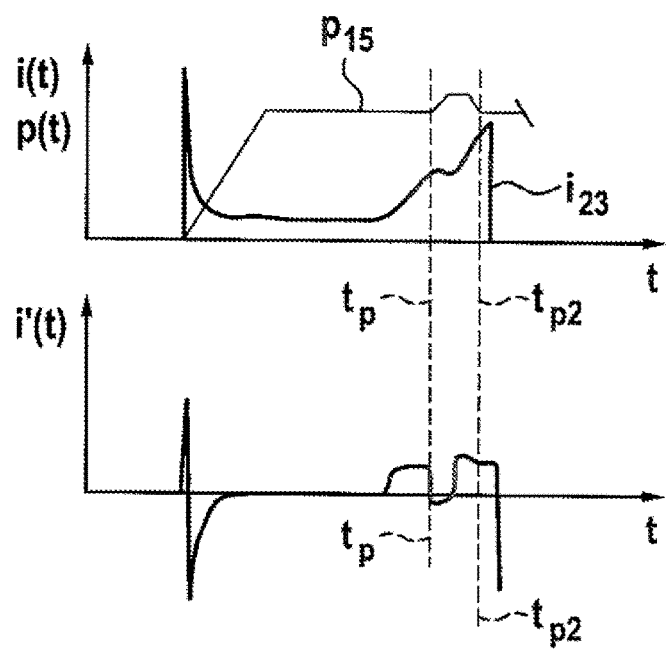
FIG. 4 illustrates an advantageous method for operating the braking system in accordance with a first exemplary embodiment.

The current curve $i_{23}$ is monitored in the clamping force buildup phase t3 to t4 and is evaluated in the phase $t_p$ to $t_{p2}$ in order to monitor whether the hydraulic pressure during the brake application phase prevails in the wheel brakes 2 of the rear axle. The pressure generator 15 is controlled within this predetermined period of time in order to test the functional capability for the purpose of increasing the hydraulic pressure above a value that is required for the enabling procedure, as is illustrated in FIG. 4. As a consequence, the actuator 22 is unloaded and the current consumption is reduced.

It is also feasible to check the temporal gradients $i'_{23}$ of the operating current signal within the present period of time for a local minimum in order to draw a conclusion about the pressure assistance of the pressure generator, as is illustrated in the lower part of FIG. 4.

Figure 5:
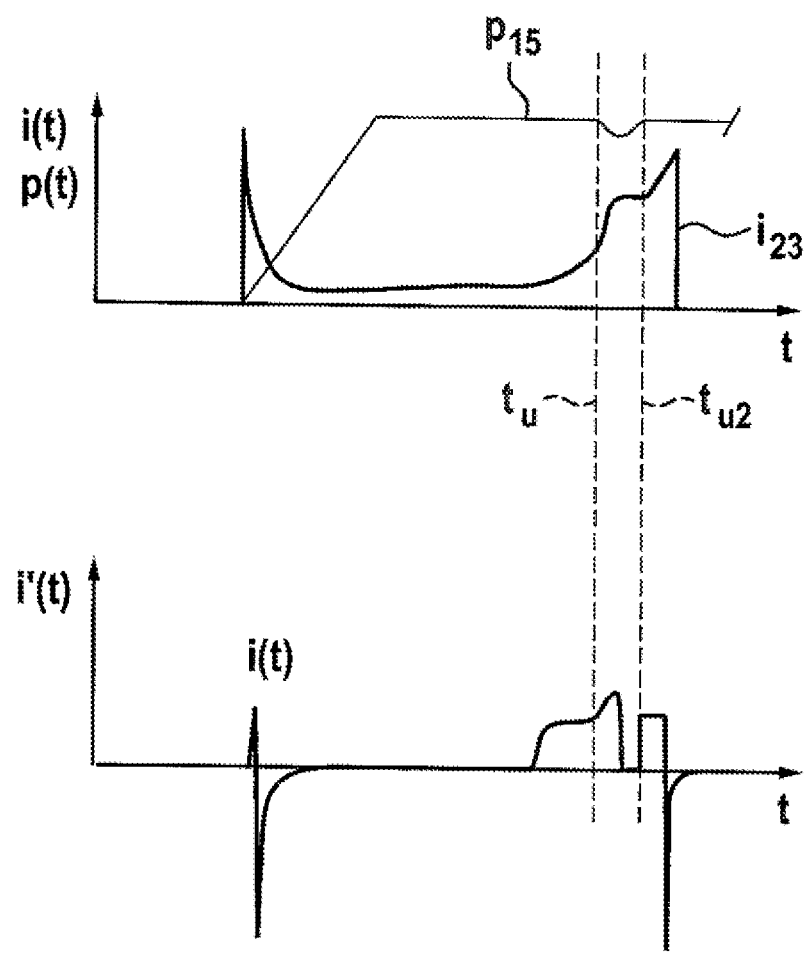
FIG. 5 illustrates a method for operating the braking system in accordance with a second exemplary embodiment.

Alternatively, in accordance with a further exemplary embodiment, it is provided that the pressure generator 15 is controlled within the predetermined period of time during the buildup of clamping force for the purpose of reducing the hydraulic assistance differently from the assistance that is required for the enabling procedure. This leads to an increase in the operating current $i_{23}$ of the actuator 22, as is illustrated in the upper part of FIG. 5. The temporal gradient $i'_{23}$ of the operating current behaves accordingly, as is illustrated in the lower part of FIG. 5.

If, when monitoring the operating current, it is identified that said operating current does not change in response to the increase or reduction of the hydraulic pressure, it is concluded that a malfunction is present in the hydraulic system of the braking system 1.

The operating current $i_{23}$ is monitored in the present case individually for each wheel brake 2. In the case of a diagonal braking circuit distribution, as is illustrated in the present case in FIG. 1, it is possible by means of using the described method to detect a malfunction in the respective circuit 4, 5 and thereby also at the respective actuator 22. A leakage in the respective circuit 4, 5 leads to the pressure assistance only being effective at one actuator 22. A trapped supply line to a wheel brake 2 likewise leads to the pressure assistance only being effective at one actuator 2.

In the case of braking force being distributed to an individual axle, it is possible by means of using the described method to conclude the following malfunction that relates to the actuators 22: a leakage in the respective braking circuit 4, 5 leads to the pressure assistance not being effective at either of the two actuators 22. A trapped supply line to a wheel brake 2 leads to the pressure assistance only being effective at one actuator 22 of the respective braking circuit 4, 5.

Advantageously, the current profiles of the actuators 22 are compared to one another in order to perform a plausibility check on the test result. As a consequence, it is possible to establish whether the hydraulic unloading or loading in the case of the two actuators of the same braking circuit 4, 5 occurs to the same extent. If this is the case, it is concluded that a correct test has been performed. If it is identified that the hydraulic loading or unloading lead to different responses in the operating currents of the two actuators 22 of the respective braking circuit 4, 5, it is concluded that the malfunction is not a trapped or damaged brake line but rather on the contrary the malfunction is in the respective wheel brake 2 or the respective actuator 22 itself.

While in relation to the present exemplary embodiment it was described that the hydraulic pressure is generated by means of the pressure generator 15, it is alternatively provided that the hydraulic pressure is generated by means of the electromechanical braking force amplifier 8. The same advantages occur in this case, wherein furthermore the electromechanical braking force amplifier 8 typically comprises a lower noise emission so that the hydraulic pressure increase occurs in a quieter manner. As mentioned above, the present braking system 1 comprises the two pressure generators so that the hydraulic pressure can be increased by means of a redundant system. If by way of example the electromechanical braking force amplifier 8 fails, the hydraulic pressure can thus still be increased by means of the pressure generator 15. Alternatively, the braking system 1 however can also comprise only one of the two pressure generators, as a result of which in particular costs and installation space can be saved.

What is claimed is:

1. A method for actuating a hydraulic braking system of a motor vehicle, the brake braking system including at least one wheel brake, a brake pedal device, at least one pressure generator configured to be controlled so as to hydraulically actuate the wheel brake, and an electromechanical actuator allocated to the wheel brake so as to actuate the wheel brake, the method comprising:
   generating a force configured to displace a brake piston of the wheel brake so as to actuate the wheel brake in each case by the pressure generator and the actuator;
   controlling the pressure generator and the actuator such that the pressure generator and the actuator together generate a total clamping force at the wheel brake as part of an enabling procedure to enable a parking brake function;
   monitoring an operating current of the actuator during the enabling procedure in order to determine a functional capability of the hydraulic braking system;
   controlling the pressure generator during the enabling procedure such that the hydraulic pressure that is generated is modulated for a predeterminable period of time in order to unload or load the actuator; and
   evaluating the operating current of the actuator in the period of time so as to determine the functional capability of the braking system.

2. The method according to claim 1, wherein the functional capability of the braking system is established if the operating current falls below a predeterminable first threshold value within the period of time when increasing the hydraulic pressure.

3. The method according to claim 1, wherein the functional capability of the braking system is established if the operating current exceeds a predeterminable second threshold value within the period of time when reducing the hydraulic pressure.

4. The method according to claim 1, wherein the functional capability of the braking system is established if a gradient of the operating current comprises a local minimum within the period of time when increasing the hydraulic pressure.

5. The method according to claim 1, wherein the functional capability of the braking system is established if a gradient of the operating current comprises a local maximum within the time period in the case of a reduced hydraulic pressure.

6. The method according to claim 1, wherein, if the braking system comprises multiple wheel brakes, each wheel brake is allocated an electromechanical actuator, and wherein the operating currents of the actuators that are evaluated within the period of time are compared to one another so as to perform a plausibility check.

7. The method according to claim 1, wherein the period of time is selected such that the period of time lies in a region of a buildup of clamping force of the wheel brake.

8. The method according to claim 7, wherein, until the region of the buildup of clamping force is reached, the pressure generator is controlled such that the hydraulic pressure is held essentially constant.

9. A control device for executing a method for actuating a braking system of a motor vehicle, the braking system including at least one wheel brake, a brake pedal device, at least one electrohydraulic pressure generator configured to hydraulically actuate the wheel brake, and an electromechanical actuator allocated to the wheel brake so as to actuate the wheel brake, the control device specifically configured to:
   actuate the pressure generator and the actuator in each case to generate a force configured to displace a brake piston of the wheel brake so as to actuate the wheel brake,
   control the pressure generator and the actuator such that the pressure generator and the actuator together generate a total clamping force at the wheel brake as part of an enabling procedure to enable a parking brake function,
   monitor an operating current of the actuator during the enabling procedure in order to determine a functional capability of the hydraulic braking system,
   control the pressure generator during the enabling procedure such that the hydraulic pressure that is generated is modulated for a predeterminable period of time in order to unload or load the actuator, and
   evaluate the operating current of the actuator in the period of time so as to determine the functional capability of the braking system.

10. A braking system for a motor vehicle, comprising:
   at least one wheel brake;
   a brake pedal device;
   at least one pressure generator configured to be controlled so as to hydraulically actuate the wheel brake;
   an electromechanical actuator allocated to the wheel brake so as to actuate the wheel brake; and
   a control device configured to control the pressure generator and the actuator together as part of an enabling procedure to enable a parking brake function, the control device specifically configured to:
      actuate the pressure generator and the actuator in each case to generate a force configured to displace a brake piston of the wheel brake so as to actuate the wheel brake,
      control the pressure generator and the actuator such that the pressure generator and the actuator together generate a total clamping force at the wheel brake as part of an enabling procedure to enable a parking brake function, monitor an operating current of the actuator during the enabling procedure in order to determine a functional capability of the hydraulic braking system, control the pressure generator during the enabling procedure such that the hydraulic pressure that is generated is modulated for a predeterminable period of time in order to unload or load the actuator, and evaluate the operating current of the actuator in the period of time so as to determine the functional capability of the braking system.

\* \* \* \* \*